April 21, 1953 R. I. HAKOMAKI ET AL 2,635,673
SEAMING APPARATUS FOR THERMOPLASTIC MATERIAL
Filed Dec. 2, 1950 3 Sheets-Sheet 1
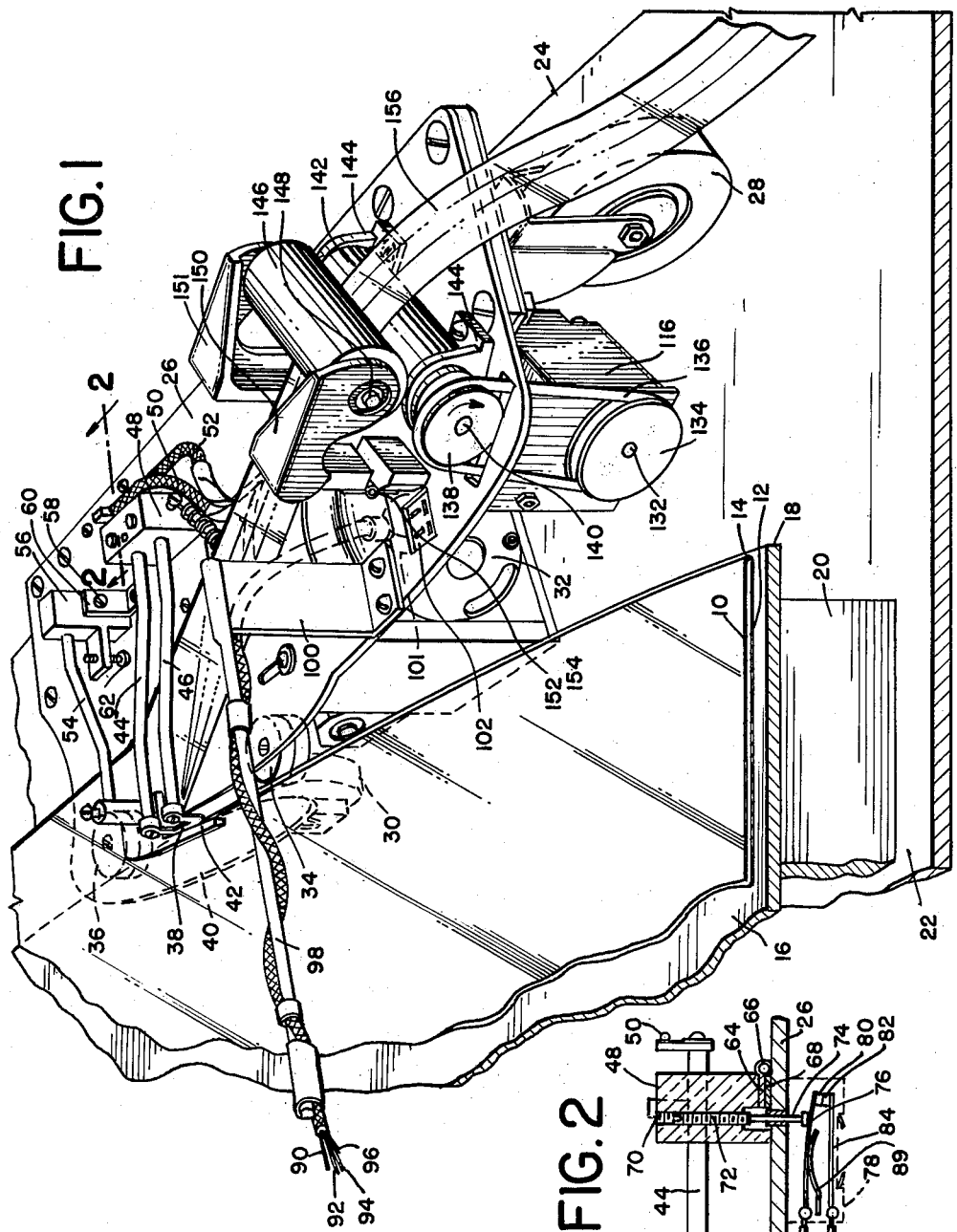
INVENTORS:-
RAYMOND I. HAKOMAKI
THOMAS R. JAMES
BY William C. Babcock
ATTORNEY April 21, 1953   R. I. HAKOMAKI ET AL   2,635,673
SEAMING APPARATUS FOR THERMOPLASTIC MATERIAL
Filed Dec. 2, 1950   3 Sheets-Sheet 2

INVENTORS:-
RAYMOND I. HAKOMAKI
THOMAS R. JAMES
BY William C. Babcock
ATTORNEY

April 21, 1953  R. I. HAKOMAKI ET AL  2,635,673
SEAMING APPARATUS FOR THERMOPLASTIC MATERIAL
Filed Dec. 2, 1950  3 Sheets-Sheet 3
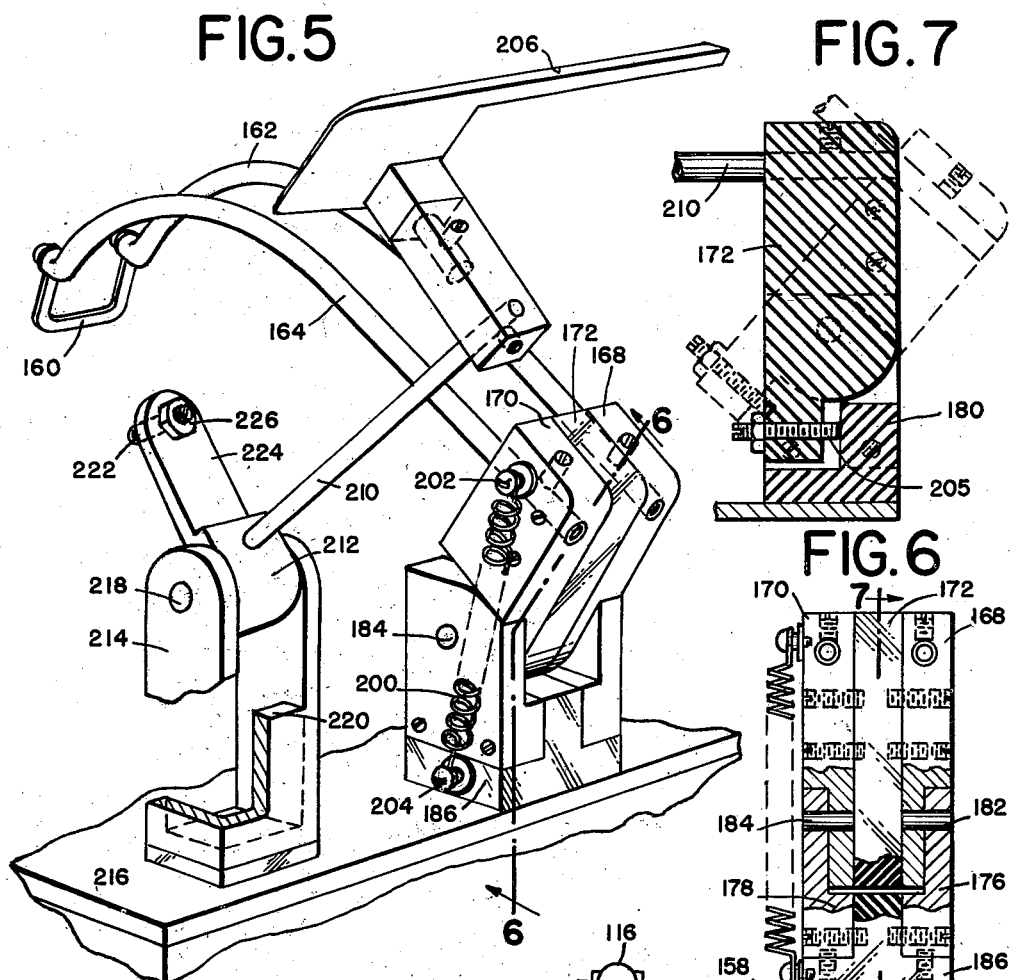
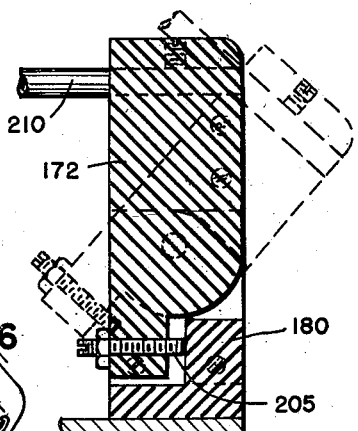
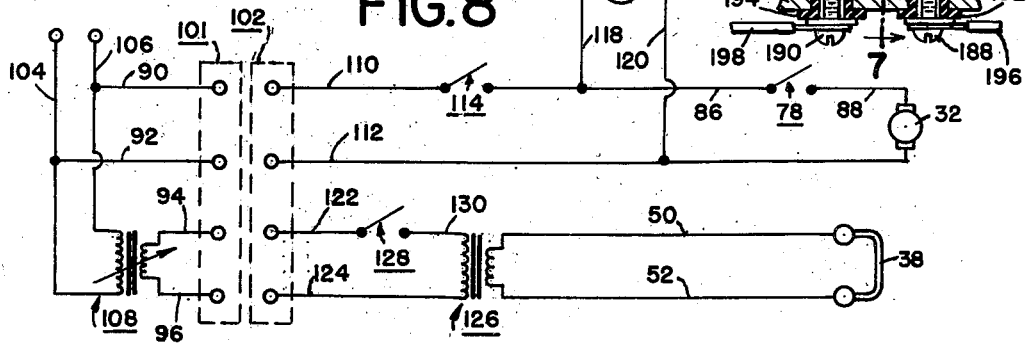
INVENTORS
RAYMOND I. HAKOMAKI
THOMAS R. JAMES
BY William C. Babcock ATTORNEY Patented Apr. 21, 1953

2,635,673

UNITED STATES PATENT OFFICE 2,635,673

SEAMING APPARATUS FOR THERMOPLASTIC MATERIAL

Raymond I. Hakomaki and Thomas R. James, Minneapolis, Minn., assignors to General Mills, Inc., a corporation of Delaware Application December 2, 1950, Serial No. 198,884

17 Claims. (Cl. 154—42)

The present invention relates to an improved apparatus for seaming together layers of thermoplastic material and more particularly to improvements in the controlling circuits and material tensioning mechanism for such a device.

Machines are already known in which a seam is formed between superimposed layers of thermoplastic sheet material by means of a welding device which moves relatively to the material along a path corresponding to the desired shape of seam. Certain features of such apparatus are described and claimed in the prior copending applications of Alton H. Carland, Serial No. 156,475, filed April 17, 1950, for Method and Apparatus for Severing and Joining Layers of Thermoplastic Material, and Raymond I. Hakomaki, Serial No. 157,703, filed April 24, 1950, for Method and Apparatus for Butt Welding Thermoplastic Material, both of which are assigned to the same assignee as the present invention.

One object of this invention is the provision of improved controlling devices for such a welding unit.

Another object is the provision of improved means for tensioning the material during the welding operation.

A further object is the provision of means for controlling the relative movement between the welding unit and sheet material in accordance with the position of the member which forms the seams.

Another object is a thermoplastic material seaming apparatus in which a heated seaming member is movable between operative and inoperative positions and in which relative movement between the sheet material and welding apparatus along the line of the desired seam can only take place when the heated member is in its operative position.

Still another object is the provision of an improved means for tensioning and removing the scrap material at the edges of the thermoplastic sheets outside the newly formed seam.

A further object is the provision of novel roller mechanism for the tensioning and removal of such scrap material.

An additional object is the provision of a pair of tensioning rollers, one of which is positively driven for rotation on its axis, while the other is urged resiliently or by gravity against the driven roller and is rotated only through engagement with the latter or with the thermoplastic material which passes between the rolls.

A further object is the provision of a pair of improved feed rollers which are substantially parallel to each other and are biased toward each other, in combination with means for positively driving only one of the rollers.

Additional objects and advantages of the present invention will be apparent from the following specification in which certain preferred embodiments are described.

In the drawings which accompany this specification and form a part of the present application, Figure 1 is a partial perspective view of a pattern table and welding unit embodying features of the present invention.

Fig. 2 is a partial sectional view on the line 2—2 of Fig. 1.

Fig. 5 is an enlarged partial perspective of portions of the device of Fig. 4.

Fig. 6 is a view on the line 6—6 of Fig. 5, with portions broken away to show details of the pivoting of the parts.

Fig. 7 is a sectional view on the line 7—7 of Fig. 6.

Fig. 8 is a wiring diagram of the device of Figs. 1–3, said wiring diagram being also applicable to the embodiment of Figs. 4 through 7.

Figure 3:
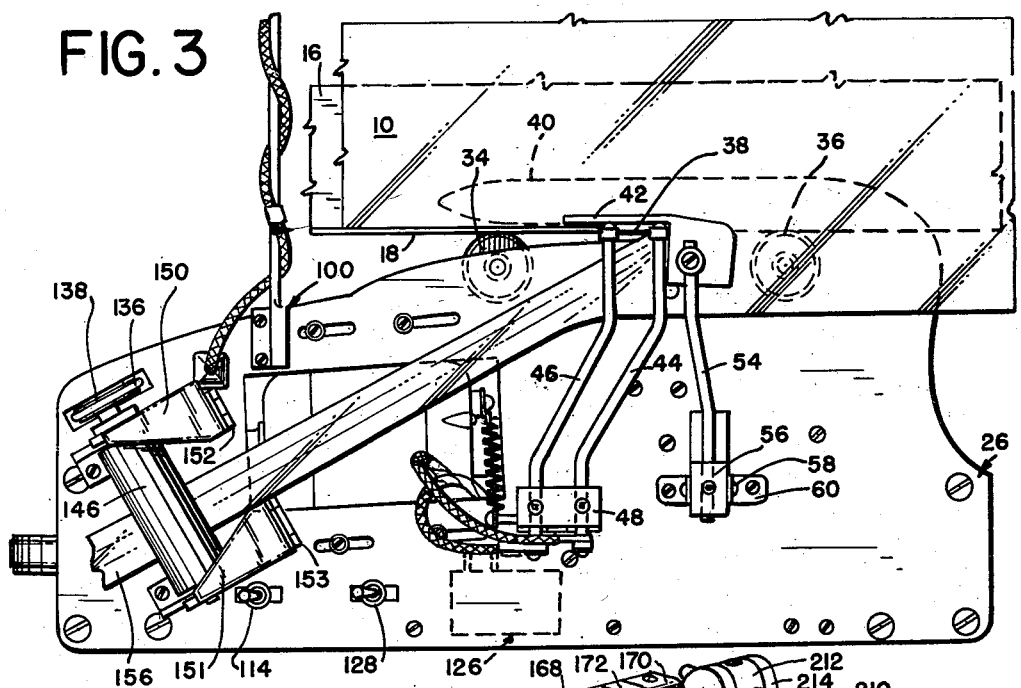
Fig. 3 is a top or plan view of the device of Fig. 1.

As shown in Fig. 1, the welding apparatus of the present invention is designed for the formation of a heat welded seam between superimposed layers 10 and 12 of thermoplastic sheet material. The seam formed between these layers is indicated at 14.

The layers of sheet material are supported on a pattern or table 16 which preferably has one edge 18 shaped to correspond with the desired seam 14. The seam can thus be formed conveniently by relative movement of the welding unit described below along the edge 18 of the pattern table 16.

The supporting table portion 16 is carried by spacers 20 a predetermined distance above a lower table portion 22. The lower table portion 22 extends outwardly beyond the shaped edge 18 of table 16 and has its outer edge 24 spaced outwardly a sufficient distance to provide a supporting runway all along the edge of the table 16 for carrying the welding unit.

The welding unit itself includes a main body or supporting plate 26. This plate is movably mounted on the table portion 22 by one or more idling or guide rollers 28 and a power driven roller 30. Roller 30 is driven by a suitable power unit, illustrated as the electric motor 32, by suitable driving connections. Such connections are shown, for example, in the above mentioned Hakomaki application.

Guide rollers 34 and 36 are mounted for rotation on vertical axes at the inner edge of supporting plate 26 for engagement with the shaped edge 18 of table 16 to guide the welding unit along the desired path.

The seam itself is formed by means of an electrically heated blade or wire 38 of the type described and claimed in the above Carland application. Wire 38 includes a portion of substantial length which is electrically heated by its own resistance and which moves axially in the plane of the material to melt and sever the sheets and at the same time form a bond between the newly severed edges. This heated seaming member 38 is supported by rigid rods 44 and 46 extending from a block 48. Rods 44 and 46 may themselves be conducting or may be made hollow in order to carry suitable conductors to the ends of the seaming member 38. Leads 50 and 52 are connected through the supporting arms 44 and 46 to the ends of the seaming member 38 to provide current for heating said member.

In order to assist in supporting and guiding the material at the proper level past the seaming member 38, lower and upper guides 40 and 42 are provided. The lower guide 40 may be provided as an extension of the supporting plate 26, while the upper guide 42 is preferably carried at the end of a supporting arm 54 extending from a block 56 pivoted at 58 to a bracket 60 on plate 26. The axis of pivot 58 extends substantially parallel to the direction of the desired seam so that the upper guide 42 may be tilted upwardly and away from the sheet material to facilitate initial orientation of the sheets and positioning of the welding unit. An adjustable stop screw 62 is provided to limit the downward movement of guide 42 and prevent it from binding too closely against the upper layer of material.

As shown in Fig. 2, the block 48 which carries arms 44 and 46 to support the heated seaming member 38 is secured at its lower end to the upper leaf 64 of a suitable hinge. The pivot pin 66 of this hinge likewise extends substantially parallel to the direction of the desired seam and is thus parallel to the longitudinal portion of the seaming member 38. The lower leaf 68 of the hinge is firmly secured to the top surface of supporting plate 26.

Because of the hinge arrangement, it is possible to swing the welding member 38 upwardly around the hinge axis 66 from the operating position of Fig. 1 to an inoperative position in which the seaming member 38 is completely removed from the thermoplastic material. Movement of the seaming member 38 to inoperative position thus facilitates the initial positioning and arrangement of the thermoplastic sheet material and the welding unit. The arrangement also makes it possible to swing the seaming member 38 upwardly away from the material should it be desired to interrupt the welding operation at any given point.

As also shown in Fig. 2, the block 48 from which the seaming member is supported is provided with a vertical threaded bore 70. An adjustable screw 78 is threaded into the bore 70 and its position vertically of the block 48 can accordingly be readily adjusted from the top of the bore.

Passing through the supporting plate 26 is an actuating plunger 74 for a suitable switch mechanism indicated generally at 78. Plunger 74 is vertically movable and is designed for engagement by the adjustable abutment or screw 72 to control the switch 78 in accordance with the position of block 48 and seaming member 38. When the seaming member 38 is in the operative position of Figs. 1 and 2, the screw 78 engages plunger 74 and forces it downwardly against one contact arm 76 of switch 78. Contact 80 carried by arm 76 is accordingly forced into engagement with contact 82 of switch arm 84 to complete a circuit between leads 86 and 88.

When the seaming member 38 and block 48 are swung upwardly about hinge axis 66 to the inoperative position of the seaming member, the screw 72 will be retracted from plunger 74 and contacts 80 and 82 can be separated by the action of a suitable spring member 89. Thus the circuit between leads 86 and 88 will be completed when the seaming member 38 is in operative position and will be broken when the seaming member is tilted to inoperative position.

At this point, the circuit diagram of Fig. 8 may be studied for an indication of the arrangement of the improved features of the controlling circuit. Current is brought to the welding unit by four leads 90, 92, 94, and 96, respectively. For convenience these leads are cabled and are carried by a supporting rod 98 (Fig. 1) which extends from a suitable bracket 100 on supporting plate 26. A plug 101 on these leads provides a removable connection to a socket 102 on the supporting plate.

As shown in Fig. 8, leads 90 and 92 are connected to supply lines 104 and 106 such as the normal 110 volt A. C. current supply lines readily available at most locations. Leads 94 and 96 are connected to a variable transformer 108 which is in turn connected to the supply lines 104 and 106. Thus the current and voltage in the leads 94 and 96 may be varied as desired by the operator for the purpose described below.

On the welding unit itself, socket 102 provides a connection from incoming leads 90 and 92 to wires 110 and 112, respectively. Wire 112 is connected to one terminal of the motor 32 which operates the driving roller 30 to cause relative movement of the welding unit along the table portion 22 and pattern edge 18. The other wire lead 110 is connected to a switch 114 (Fig. 3), the other terminal of which is connected to lead 86 and switch 78. The other lead 88 from switch 78 is connected to the remaining terminal of driving motor 32. From this portion of the circuit it will be apparent that if both switches 78 and 114 are closed, the driving motor 32 will be energized. If either switch is open, the driving motor 32 will be deenergized. Thus it is impossible to start motor 32 unless the seaming member 38 is in operative position so that switch 78 is closed. At the same time, once both switches are closed and the device is operating, it is a simple matter to stop the motor 32 either by operation of switch 114 or merely by movement of the seaming member 38 to inoperative position to open switch 78.

An additional motor 116 (Fig. 1) is provided for the tensioning and scrap take-off rollers and is connected by leads 118 and 120 to the conductors 86 and 112, respectively. Thus it will be clear that motor 116 is controlled only by switch 114. Whenever this manual switch is closed, as at the start of a welding operation, the tensioning and take-up rollers will be driven in the manner described below through energization of motor 116. The motor will continue to be energized and will thus maintain the desired tension, even though the operation of driving motor 32 should be interrupted by movement of the seaming member 38 to inoperative position.

With further reference to Fig. 8, socket 102 also provides connections from leads 94 and 96 to conductors 122 and 124. Conductor 124 is connected to one terminal of a step-down transformer 126. Lead 122 is connected to another manual switch 128 (Fig. 3). The other terminal of switch 128 is connected by lead 130 to the remaining primary terminal of transformer 126.

The secondary circuit of transformer 126 is connected by leads 50 and 52, previously described, to the seaming member 38. Thus the manual switch 128 controls the passage of current to transformer 126 and accordingly controls the heating or energizing of the seaming member 38. The exact voltage of current applied to the seaming member may be varied by the variable transformer 108 (not shown) which may thus be located on a stationary portion of the table.

The tensioning and scrap removal mechanism is driven by motor 116. The shaft 132 of the motor carries a driving pulley 134, which is connected by a belt 136 to a driven pulley 138 on shaft 140. A tensioning and scrap take-off roller 142 is keyed to shaft 140 and is driven in the direction of the arrow in Fig. 1 by the connections just described, whenever motor 116 is energized. The shaft 140 of roller 142 is journaled in bearings 144 secured to the supporting plate 26.

An auxiliary or non-driven roller 146 is keyed to a shaft 148 which is supported in bearings in members 150 and 151 so that the roller 146 is substantially parallel to roller 142 and located above the latter. Supporting arms 150 and 151 are pivoted at 152 and 153, respectively, to suitable supporting members 154 on plate 26. It will be noted that the bearings for shaft 148 are located at one end of each of the members 150 and 151 while the hinges 152 and 153 are located respectively at the other ends. Therefore the weight of the arms 150 and 151 as well as the weight of roller 146 and shaft 148 tends to rotate the members around the axes of hinges 152 and 153 so that roller 146 will be urged downwardly by gravity into contact with the upper surface of roller 142.

As shown in Figs. 1 and 3, the seam 14 is necessarily formed inwardly from the edges of the thermoplastic sheets 10 and 12. A certain portion of the material, indicated at 156, is accordingly severed and must be removed from the seam area. This scrap material also furnishes a convenient means for tensioning the outer portions of the thermoplastic sheets at the point of operation of the seaming member 38. This scrap material 156 is led away from the seaming member at an angle from the direction of the desired seam and passes between the rollers 142 and 146. As shown in Fig. 3, these rollers are laterally displaced outwardly from the line of the seam and the roller axes are inclined with respect to the seam line so that a line perpendicular to the axes of the rollers as illustrated in Fig. 3 will substantially intersect the seam line at the area of operation of the seaming member 38.

The scrap or salvage material 156, which passes between rollers 142 and 146, is held against the lower driven roller 142 by the weight of the upper roller and is thus tensioned away from the area of the welding operation. The driving connections from motor 116 to roller 142 are such that the peripheral or surface speed of the roller is slightly greater than the speed at which the welding unit moves along the table. Since, however, the upper roller 146 is not positively driven, some slippage is permitted between the scrap material 156 and the lower roller 142. The effect of this arrangement is to maintain the scrap material 156 under tension at all times, whenever the motor 116 is energized, whether the supporting plate 26 is moving along the table portion or not. If the welding unit is moving, the amount of slippage will be less and the scrap material will be tensioned and pulled away from the area of the newly formed seam so that it will not interfere with the seaming member 38. If the relative movement of the welding unit is stopped for any reason, the arrangement of rollers 142 and 146 is such that more slippage will be permitted and the scrap material 156 will be held under a certain amount of tension but will not be fed through the rollers. Consequently, the material will not be torn as would be the case if the scrap-removal rollers were both positively driven in firm engagement with the material.

As shown particularly in Fig. 3, the two shaft ends which support roller 146 are carried by the separately pivoted members 150 and 151. The bearing openings for the roller shafts are sufficiently large to accommodate slight tilting of the roller 146. The use of the separate bearing arms and their separate pivoting thus permit the upper roller 146 to adjust itself angularly to engage the scrap material 156 whether such material is at one end of the roller or the other.

Figure 4:
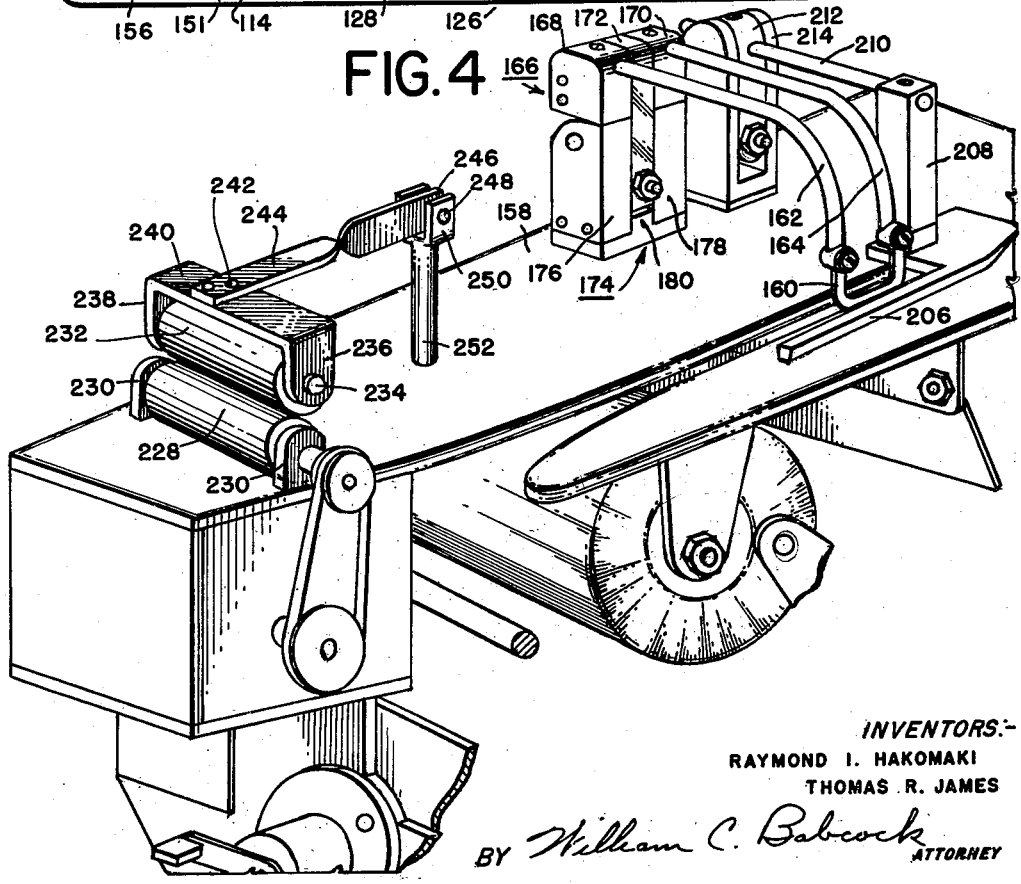
Fig. 4 is a partial perspective view of a modified embodiment of the invention.

In the modified construction shown in Fig. 4, certain variations in the mounting of the upper take-off roller and in the mounting of the welding member and upper guide are shown. Here the main supporting plate 158 and the driving and power connections may be substantially the same as in the embodiment of Figs. 1–3. In this case, the welding member 160 is carried by arms 162 and 164 from a pivoted block 166. Block 166 is a composite block and includes outer conducting portions 168 and 170 and an intermediate insulating portion 172.

A supporting member 174 is provided for this upper block 166. Member 174 is likewise made up of side portions 176 and 178 which are of electrically conducting material and an intermediate portion 180 of insulating material. As shown in Fig. 6, the blocks 166 and 174 are hinged together by conducting pins 182 and 184. Pin 182 hinges conducting sections 168 and 176, while pin 184 hinges together and electrically connects sections 170 and 178.

It will be noted that the intermediate insulating section 180 of the lower support includes a transversely extending portion 186 which completely insulates the conducting portions 176 and 178 from the supporting plate 158. The supporting plate is provided with openings through which conducting and securing bolts 188 and 190 may project. These bolts likewise pass through the insulating portion 186 and into the respective conducting portions 176 and 178. Insulating bushings 192 and 194 prevent electrical contact between these bolts and plate 158.

As shown in Fig. 6, bolts 188 and 190 provide electrical connections between leads 196 and 198 for passage of current through such leads, through the conducting bracket portions 176 and 178, the respective pins 182 and 184, the upper bracket portions 168 and 170, and finally the metallic electrically conducting supporting arms 162 and 164 for the seaming member 160.

In order to retain the seaming member 160 in either the operative position of Fig. 4 or the inoperative position of Fig. 5, an overcenter spring 200 is provided. One end of this spring is connected at 202 to the upper conducting section 170. Its other end is connected at 204 to the lower insulating block portion 186. The points of connection at 202 and 204 are so chosen that in the operating position of Fig. 4 the spring will lie on one side of the axis of pivot pins 182 and 184 and will thus tend to retain the parts in the operative position. The spring location is such that when the parts are moved to the inoperative position of Fig. 5, the spring 200 will lie on the opposite side of the axis of pivot pins 182 and 184 and will retain the parts in the inoperative position.

It should be noted in both the embodiment of Figs. 4–6 and that of Figs. 1–3 that the use of step-down transformers in the particular apparatus illustrated has resulted in relatively low voltages across the seaming members. Therefore, while the conducting parts must be insulated from each other, the voltages are sufficiently low so that there is no particular hazard to the operator. Thus even the metallic conducting portions of the seaming member supports can be grasped manually to move the seaming member between its operative and inoperative positions.

A stop screw 205 is provided in the insulating portion 172 of the embodiment of Figs. 4–7, to limit the downward movement of seaming member 160 in its operative position. The combination of this stop member with the overcenter spring 200 will thus position the seaming member 160 accurately in the plane of the thermoplastic material as desired.

As shown in Figs. 4 and 5, the upper guide member 206 is supported by a downwardly extending post 208 at the outer end of a cross arm 210 secured in the member 212. Member 212 is pivotally mounted between the arms 214 of a supporting bracket 216, by means of pivot pin 218. A cross web 220 extends between the arms 214 at one side of the bracket and provides a stop against which the adjustable screw 222 may engage. Screw 222 is carried in a projection 224 on member 212 and is locked in its adjusted position by lock nut 226. The upper guide 206 can accordingly be moved to the operative position of Fig. 4, where downward movement of the guide is determined by the adjustment of screw 222. It can also be moved to the inoperative position of Fig. 5.

The tensioning and scrap removal rollers of the device of Fig. 4 perform substantially the same function as the rollers 142 and 146 of the device of Figs. 1–3. In this case, the lower roller 228 is rotatably supported in brackets 230 on the supporting plate 158 and is positively driven from a motor just as in the case of roller 142 and motor 116 of the previous embodiment. The upper roller 232 has a shaft 234 supported in bearing arms 236 and 238 extending downwardly at each end of a cross member 240. The central portion of this cross member 240 is secured at 242 to one end of a longitudinally extending supporting arm 244. This arm will extend longitudinally but at such an angle as to substantially intersect the area of operation of seaming member 160, so that rollers 228 and 232 are oriented in the same fashion described for rollers 142 and 146. The forward end of member 244 is pivoted at 246 to a pin 248 in the upwardly projecting spaced arms 250 of a supporting post or bracket 252. Member 252 is fastened on supporting plate 158. By providing a bearing opening at 246 which is slightly larger than the diameter required to accommodate pivot pin 248, some transverse tilting of the upper roller 232 is permitted just as in the manner of roller 146. At the same time the weight of the roller 232 and its supporting members 240 and 244 normally maintain the roller in engagement with the driven roller 228 so as to exert tension on the scrap material at all times that the lower roller is operating.

It will be apparent from the foregoing description that improved features of a thermoplastic welding apparatus have been provided which accomplish the objects set forth at the beginning of this specification.

Since minor variations and changes in the exact details of construction will be apparent to persons skilled in this field, it is intended that this invention shall cover all such changes and modifications as fall within the spirit and scope of the attached claims.

Now, therefore, we claim:

1. Apparatus for seaming superimposed layers of thermoplastic sheet material comprising a supporting member, driving means for causing relative movement between the supporting member and material along the line of the desired seam, a welding member, means mounting the welding member on the supporting member for movement between operative and inoperative positions with respect to said material, and control means operatively connected with said driving means for energizing and de-energizing the driving means, said control means being operatively connected to said mounting means and automatically de-energizing the driving means and preventing such relative movement when the welding member is in its inoperative position.

2. Apparatus according to claim 1 in which said control means is an electric switch actuated by the movement of the welding member between operative and inoperative positions.

3. Apparatus according to claim 1 having an electric circuit for the welding member, said circuit being energized for the welding operation, and separate control means for energizing said circuit independently of the position of the welding member.

4. Apparatus according to claim 1 having additional control means operatively connected to the driving means for independently and selectively de-energizing said driving means, when the welding member is in operative position.

5. Apparatus for seaming superimposed layers of thermoplastic sheet material comprising a support, driving means for causing relative movement between the support and material along the direction of the desired seam, a welding member, means mounting the welding member on the support for movement between operative and inoperative positions with respect to the material, rotary tensioning means on the support having engagement with the material and thereby tensioning it when said rotary means is in operation, first manual control means for selectively energizing and de-energizing said rotary tensioning means, and second control means for selectively energizing and de-energizing said driving means, said second control means being operatively connected to said mounting means and automatically de-energizing the driving means in response to movement of the welding member from operative to inoperative position.

6. Apparatus according to claim 5 having an electric circuit for the welding member, and third control means for energizing and de-energizing said circuit independently of both said first and second control means.

7. Apparatus for seaming superimposed layers of thermoplastic sheet material comprising a support, driving means for causing relative movement between the support and material along the direction of the desired seam, a welding member, means mounting the welding member on the support for movement between operative and inoperative positions with respect to the material, rotary tensioning means on the support having slipping engagement with the material and thereby tensioning it regardless of the speed of such relative movement when said rotary means is in operation, first manual control means for selectively energizing and de-energizing said rotary tensioning means, and second control means for selectively energizing and de-energizing said driving means, said second control means being operatively connected to said mounting means and automatically de-energizing the driving means in response to movement of the welding member from operative to inoperative position.

8. Apparatus according to claim 7 in which the rotary tensioning means includes a driven roller having a surface speed of rotation greater than the speed of such relative movement, and a substantially parallel idling roller, at least one of said rollers being biased toward the other for slipping engagement of the rollers against opposite sides of a portion of said sheet material located therebetween, whereby said portion of material will be tensioned and fed smoothly regardless of variations in the speed of relative movement of the material and support.

9. Apparatus according to claim 8 in which one of said driven and idler rollers is mounted above the other and is movably supported for gravity engagement with the other roller.

10. Apparatus for seaming superimposed layers of thermoplastic sheet material comprising a support, driving means for causing relative movement between the support and material along the direction of the desired seam, a welding member, means mounting the welding member on the support for movement between operative and inoperative positions with respect to the material, rotary tensioning means on the support having engagement with the material and thereby tensioning it when said rotary means is in operation, first manual control means for selectively energizing and de-energizing both said rotary tensioning means and said driving means, and second control means for independently de-energizing said driving means, said second control means being operatively connected to said mounting means and automatically de-energizing the driving means in response to movement of the welding member from operative to inoperative position without de-energizing the rotary tensioning means.

11. Apparatus according to claim 10 in which said first and second control means comprise first and second switches respectively, said driving means comprises a first electric motor, and said tensioning means having a second electric motor, said first switch being connected in series with both motors and said second switch being connected in series with the first switch and with only the first motor.

12. Apparatus for seaming superimposed layers of thermoplastic sheet material comprising a support, driving means for causing relative movement between the support and material along the direction of the desired seam, a welding member passing through the material and simultaneously severing and seaming said sheets at a point spaced from the free edges of the sheets and thereby forming a strip of waste material at the side of the welding member opposite the desired seam, and rotary tensioning means for said waste strip mounted behind the welding member and laterally offset from said seam, said tensioning means comprising a driven roller having a surface speed of rotation greater than the speed of such relative movement, and a substantially parallel idling roller, at least one of said rollers being biased toward the other for slipping engagement of the rollers against opposite surfaces of said waste strip, whereby said strip is tensioned smoothly and fed at the exact speed at which said relative movement takes place.

13. Apparatus for seaming superimposed layers of thermoplastic sheet material comprising a support, driving means for causing relative movement between the support and material along the direction of the desired seam, a welding member for seaming said sheets, and rotary tensioning means for said material, said tensioning means comprising a driven roller having a surface speed of rotation greater than the speed of such relative movement, and a substantially parallel idling roller, at least one of said rollers being biased toward the other for slipping engagement of the rollers against opposite sides of a portion of said sheet material located therebetween, whereby said portion of material will be tensioned and fed smoothly regardless of variations in the speed of relative movement of the material and support.

14. Apparatus according to claim 13 in which one of said driven and idler rollers is mounted above the other and is movably supported for gravity engagement with the other roller.

15. Apparatus for seaming superimposed layers of thermoplastic sheet material comprising a support, driving means for causing relative movement between the support and material along the line of the desired seam, a welding member mounted on the support for movement between operative and inoperative positions with respect to said material, and control means operatively controlling the driving means and mounted for movement between a first position in which the driving means is operative to cause said relative movement and a second position in which the driving means is inoperative, said control means being operatively connected to said welding member for automatic movement to its second position in response to movement of the welding member to inoperative position.

16. Apparatus for seaming superimposed layers of thermoplastic sheet material comprising a support, electrically energized driving means for causing relative movement between the support and material along the line of the desired seam, a welding member mounted on the support for movement between operative and inoperative positions with respect to said material, and control means including an electric switch connected in circuit with said driving means and movable between a first position in which the driving means is energized and a second position in which the driving means is deenergized, said switch being operatively connected for automatic movement from its first to its second position in response to movement of the welding member to inoperative position.

17. Apparatus according to claim 16 having an electrically energized welding member and electric circuit means for energizing the welding member independently in both the operative and inoperative positions of the welding member.

RAYMOND I. HAKOMAKI.
THOMAS R. JAMES.

References Cited in the file of this patent

UNITED STATES PATENTS

| Number | Name | Date |
|---|---|---|
| 2,505,647 | Norris | Apr. 25, 1950 |
| 2,535,029 | Atanasoff | Dec. 26, 1950 |